United States Patent [19]

Tiitola et al.

[11] Patent Number: 4,632,673
[45] Date of Patent: Dec. 30, 1986

[54] PIERCEABLE PORT FOR CONTAINERS

[75] Inventors: Juha K. Tiitola, Pirkkala; Juhani A. Ikonen, Tampere; Heikki S. Suominen, Tampere; Juha A. Henttonen, Tampere, all of Finland

[73] Assignee: Hantaaki Oy, Tampere, Finland

[21] Appl. No.: 754,687

[22] Filed: Jul. 15, 1985

Related U.S. Application Data

[63] Continuation of Ser. No. 504,544, Jun. 15, 1983, abandoned.

[51] Int. Cl.⁴ .................. B65D 41/32; B65D 41/50; B65D 41/62
[52] U.S. Cl. .................................... 604/415; 604/111
[58] Field of Search ............ 604/86, 110, 111, 408, 604/415; 215/249, 251, 253, 256, 305

[56] References Cited

U.S. PATENT DOCUMENTS

| | | |
|---|---|---|
| 2,587,929 | 10/1958 | Gossett et al. |
| 2,704,075 | 3/1955 | Cherkin |
| 2,856,828 | 10/1958 | Gossett et al. |
| 3,064,652 | 11/1962 | Corcoran |
| 3,306,563 | 2/1967 | Soto |
| 3,343,541 | 9/1967 | Bellamy, Jr. |
| 3,509,879 | 5/1970 | Bathish et al. |
| 3,888,377 | 6/1975 | Stadler ........................... 215/249 |
| 3,915,212 | 10/1975 | Bujan et al. |
| 3,994,412 | 11/1976 | Difiglio |
| 4,180,173 | 12/1979 | Diaz ................................. 604/111 |
| 4,187,893 | 2/1980 | Bujan ............................. 604/408 |
| 4,303,067 | 12/1981 | Connolly et al. |
| 4,307,766 | 12/1981 | Tanokura |
| 4,430,077 | 2/1984 | Mittleman et al. ............. 604/111 |

FOREIGN PATENT DOCUMENTS

| | | |
|---|---|---|
| 0011144 | 10/1979 | European Pat. Off. |
| 2186402 | 1/1974 | France |
| 1132845 | 11/1968 | United Kingdom |
| 1363136 | 8/1974 | United Kingdom |
| 1479045 | 12/1974 | United Kingdom |
| 1428373 | 3/1976 | United Kingdom |
| 1544811 | 4/1979 | United Kingdom |
| 1579065 | 11/1980 | United Kingdom |
| 2066210 | 7/1981 | United Kingdom |

Primary Examiner—C. Fred Rosenbaum
Assistant Examiner—Michelle N. Lester
Attorney, Agent, or Firm—Pollock, Vande Sande & Priddy

[57] ABSTRACT

A pierceable port for injecting or withdrawing a fluid through a hollow needle inserted into a container. The port has a covering film securing a sterile pad of resealable material to a wall of the container having a portion pierceable by a needle. A tear strip is heat welded to the cover so as to form a removable tab comprised of a welded tear strip section, a welded cover section and an unwelded lap forming a grip for removing the tab. The tab is connected to an unwelded portion of the cover by a tear joint of substantially less tear strength than either the tab or the unwelded cover portion. The cover and the base member define a chamber for maintaining the sterility of the pad until the tab is removed to expose a sterile portion of the pad for insertion of the needle. A method for making the port is described.

20 Claims, 17 Drawing Figures

PIERCEABLE PORT FOR CONTAINERS

This is a continuation of co-pending application Ser. No. 504,544 filed on June 15, 1983, now abandoned.

TECHNICAL FIELD

The invention relates to containers which hold sterilized liquids, such as blood plasma or pharmaceutical solutions for medicinal use. More particularly, the invention is concerned with infusion bags and other containers having a port for injecting drugs and the like into the container contents with a hypodermic needle without rupturing the container or causing leakage of its contents and without introducing a contaminate.

BACKGROUND OF THE INVENTION

Attempts have been made in the past to prepare infusion bags with a thickened portion or pad through which a hypodermic needle may be inserted for the purpose of injecting a drug or other medication into the contents of the bag. Such entry pads have been made from relatively thick, resilient material, such as rubber. Resilient pads of this type are suggested in U.S. Pat. No. 2,704,075 to Cherkin and in British Pat. No. 1,579,065 to A/S Haustrup Plastic.

The pad should be capable of providing sufficient support to hold a needle in place so as not to puncture adjacent or opposing portions of the bag. The pad material also should seal against leakage both along the exterior of the needle during injection and after removal of the needle. Difficulties have been experienced in the past in securing such resilient pads to the thin-film plastic materials from which the bags are made.

Another problem is that of keeping the outer surface of the injection pad sterile when the pad is pierced by a hypodermic needle. Although various types of coverings have been suggested in the past to keep the surface of the pad sterile, these coverings have certain disadvantages. For example, a pressure sensitive adhesive strip may come loose as the adhesive ages and loses its effectiveness. Plastic coverings welded to the wall of the bag may be difficult to tear or otherwise remove without violating the sterility of the pad.

Although U.S. Pat. No. 3,343,541 to Bellamy suggests a tearable covering for the port of a parenteral container, the covering is made from a relatively thin tearable film. This thin tearable film must be attached both to a thicker pull strip and to the bag wall around the port area. Because the tearable film is relatively fragile, it is difficult to handle and to secure to both the pull strip and the bag wall. Furthermore, the resulting covering may be easily ruptured unintentionally during manufacture or subsequent handling of the bag, thereby contaminating the port area.

Due to difficulties in reopening a sealed plastic tube, infusion bags previously have been provided with multiple tubes in communication with the bag interior. For example, a bag may have separate tubes for filling, for emptying and for adding medications immediately prior to use. Such multiple tube arrangements are expensive to manufacture and increase the likelihood of an inadvertently broken connection.

DISCLOSURE OF THE INVENTION

The present invention provides an improved means for attaching and protecting the sterility of an elastomeric pad that allows a hypodermic needle to be inserted into and removed from a thin-film plastic wall or other pierceable container member without contamination or leakage of the container contents. The elastomeric, resealable pad is firmly secured to the container by a covering film that is preferably heat welded to a supporting base member by dielectric, ultrasonic or hot press sealing.

The pad cover includes a tear-away section that is attached to a tear-away strip by heat welding with a heating punch or probe having an arcuate contact surface on its underside to provide a relatively thin connection or tear-away joint between the covering layer and the tear-away tab. The tear-away strip is made from a thin-film plastic material which preferably has the same composition as the covering film and may be of the same or less thickness.

In the process of forming the port structure, the tear-away strip preferably is heat welded to the covering film prior to placing the covering film over the elastomeric pad. This heat welding is done preferably by dielectric heating with high frequency radiant energy, although other types of heat welding or sealing may be used. In one embodiment, the covering film is then secured to the wall of a container, such as an infusion bag, by an adhesion layer. While heat welding of the tear-away strip to the covering layer is preferred, adhesion means other than heat welding, such as a layer of adhesive, may be used to secure the covering layer to the container.

In another embodiment of the invention, the covering film is welded or otherwise adhered to a mounting film. The resulting module may be solvent welded to the container by swabbing the underside of the mounting film and a supporting area of the container with a solvent for the film and container materials, such as hexyl or isohexyl alcohol where both the film and the container are of a polyvinyl chloride resin. Such solvents are also antiseptic and will therefore sterilize the abutting surfaces of the mounting film and container. Alternatively, the underside of the mounting film may be coated with a pressure sensitive adhesive for securing the resulting module to the container. This embodiment of the port structure may be packaged for sale and distribution on a backing layer or strip which is removed from the pressure sensitive adhesive immediately prior to placing the port module on a container. In this application, the injection port is attached only to those containers into which a medication is likely to be injected and can be so placed by the supplier filling the containers or by the ultimate user of the container contents.

In other embodiments, the port structures of the foregoing embodiments are attached to a tube or tube-like structure instead of directly to a wall of the container. Where the port is mounted on a tube, the injection pad is preferably sealed from the interior of the container so that liquid contained in the container will not be contaminated by the elastomeric pad material which may contain leachable ingredients. These embodiments may also be mounted on the necks of plastic or glass vials, bottles or the like containing medication to be withdrawn by inserting a hypodermic needle through the pad and filling a syringe attached to the needle.

A further embodiment of the invention provides an infusion bag with a single plastic tube communicating with the bag interior and serving as a unitary inlet, outlet and injection tube capable of being filled and emptied by a wide variety of fill and discharge connectors. This unitary tube performs all of the functions previously mentioned, namely, filling the bag, injecting medication into the bag contents, and discharging the bag contents into the patient.

The pad material is preferably a self-sealing type of elastomer, such as natural or synthetic rubber. It may also be comprised of polyvinyl chloride or similar hard plastic compositions which have been softened by the addition of plastisizers. One example of a highly plastisized injection pad of polyvinyl chloride is described in U.S. Pat. No. 2,856,929 to Gossett, et al., the entire contents of said patent being incorporated herein by reference.

Thin-film plastics may be employed for the container walls, the pad cover, the tear-away strip, and the pad protector and are preferably of a polyvinyl chloride resin having good leach resistant characteristics toward the fluid to be stored in the bag. Polyvinyl chloride is preferred because its dipolar composition has good heat sealing characteristics upon exposure to dielectric heating devices used for welding plastic layers together.

BRIEF DESCRIPTION OF THE DRAWINGS

The invention is disclosed in the accompanying drawings in which.

BEST MODE AND OTHER EMBODIMENTS FOR CARRYING OUT THE INVENTION

Figures 1, 2, 3, 4, 5:
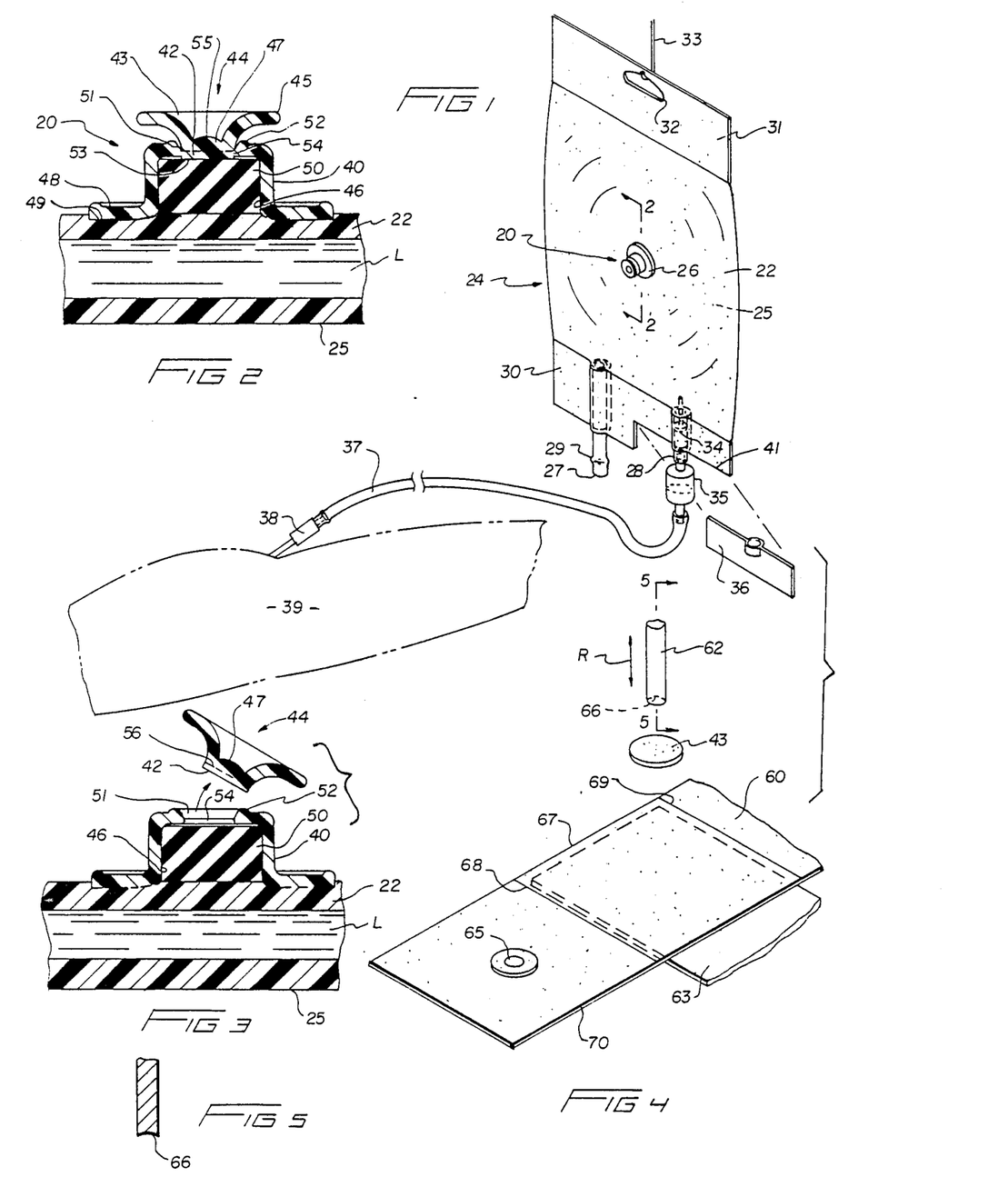
FIG. 1 is a perspective view of an infusion bag made in accordance with the invention and illustrating its actual use in injecting medicinal fluid into a patient.
FIG. 2 is a sectional view in elevation taken along lines 2—2 of FIG. 1 and illustrating the injection port of the invention with the tear-away tab in place.
FIG. 3 is a sectional view similar to FIG. 2 illustrating removal of the tear-away tab to expose the sterile injection pad.
FIG. 4 is a diagrammatic view in perspective of a method for applying the tear-away strip to the covering film.
FIG. 5 is a sectional view in elevation taken along lines 5—5 of FIG. 4 and showing details of the heat welding probe.

FIGS. 1-3 disclose an injection port 20 which is secured to wall 22 of bag 24 by means of a heat welded skirt 26. Bag 24 also comprises a second thin-film wall 25 opposite to wall 22, and an inlet tube 27 and an outlet tube 28 secured between walls 22 and 25 which are heat welded together around penetrating portions of the tubes so as to form a supporting flange 30. Inlet tube 27 is used to fill bag 24 with blood plasma or other medicinal liquid L and is then crimped by heat welding along a section 29 to seal the tube passage communicating with the bag interior. Outlet tube 28 serves as a passage for discharging the bag contents and includes a diaphragm 34 which serves as a preformed barrier for keeping the bag contents sealed until immediately prior to use, at which time the diaphragm is pierced by a catheter, draw-off needle or the like. In lieu of projecting beyond the edge of the bag as does fill tube 27, outlet tube 28 preferably is sealed by a removable section 36 of flange 30 which is crimped to provide a weakened tear-off line 41. This seal maintains the sterility of the outer portion of tube 28 beyond diaphragm 34.

The opposite ends of the bag walls are also welded together to form a flange 31 having an aperture 32 for receiving a supporting hook 33 for hanging the bag so that its contents can be discharged. Outlet tube 28 may be connected to a drip chamber 35 for monitoring the flow of fluid passing down tube 37, through hypodermic needle 38 and into arm 39 of a patient.

In FIG. 2, port 20 comprises a covering film 40 having a removable section 42 heat welded to a tear-off strip 43 having an overlap portion 45 forming a gripping lap. The tear-off strip has a central section 47 heat welded to removable cover section 42. Cover section 42, strip section 47 and lap 45 form a tear-away tab 44. Cover 40 has an annular skirt portion 48 heat welded in the area 49 to bag wall 22 so as to secure firmly against the bag wall a pierceable and resealable injection pad 50 of rubber or a rubber-like elastomer. Cover 40 cooperates with the base film provided by bag wall 22 or by an intervening subfilm (e.g., film 85 of FIG. 7) to form a sealed chamber 46 for maintaining the sterility of sterile pad 50 until tab 44 is removed.

In FIGS. 2 and 3, as well as in the other cross-sectional views, the thickness of bag walls 22 and 25, cover 40 and tear-off strip 43 has been exaggerated relative to the thickness of pad 50 for purposes of clearly showing the interrelationship of these elements. The bag walls, the cover and the tear-off strip are of thin-film plastic and rubber-like pad 50 is preferably about 5 to 20 times, and more preferably about 10 times, the thickness of these films. The thickness of tear-off strip 43 is preferably about equal to or less than the thickness of cover 40.

A specially designed probe is used in the heat welding process for attaching tear-off strip 43 to cover 40 such that cover material under the probe flows outward, leaving the relatively thin cover section 42 heat welded to section 47 of the tear off strip. The covering material flowing away from the heat welded area is represented by upper bulge 52 and lower button 53 in cover film 40. The melted portion of strip 43 may bulge upward as at 55. The welding process thus forms a weakened connection or joint 54 which will tear to expose the upper surface of pad 50 when tear-away tab 44 is pulled away as illustrated in FIG. 3. Dotted line 56 represents the heat weld between cover section 42 and tear-off strip section 47. Tab 44 thus includes removable cover section 42.

For purposes of simplicity, tear-off tab 44 may be referred to hereinafter merely as the tab or the removable tab. Bag walls 22 and 25, cover film 40, and tab film 43 are all preferably of the same type of heat weldable elastomeric material, such as polyvinyl chloride. Pad 50 is preferably of a resealable natural rubber or a resealable synthetic rubber elastomer. Both pad 50 and tab 44 are preferably disc-like members as seen best in FIGS. 1, 4 and 6. Similarly, welded sections 42 and 47 are circular in planar cross-section and tab 45 comprises an annular overlap portion.

The process for forming port structure 20 will now be described with reference to FIGS. 4, 5 and 6. A continuous sheet 60 of thin-film plastic material is fed between a probe 62 and a platen 63 of a dielectric heat welding device (not shown) for welding tab disc 43 to sheet 60 in a circular area 65 corresponding to the shape of the contact area 66 on the underside of welding probe 62. The welded area 65 corresponds to the central section 47 of tab 44. Contact area 66 of probe 62 has preferably an arcuate concave cross-section as shown in FIG. 5 so as to produce welded sections 42 and 47, adjacent tear joint 54, and unwelded or poorly welded area 51 as illustrated in FIGS. 2 and 3.

After tear strip 43 has been heat welded to continuous sheet 60, probe 62 moves upwardly in the direction of arrow R so that the next section 67 may be advanced into position on platen 63 beneath probe 62. Either before or after or simultaneously with the welding process, sheet 60 is cut along lines 68 and 69 to form cover piece or blank 70.

Cover piece 70 is then advanced to the next station of the forming process at which a continuous plastic tube 72 is advanced over a welding platen 73 which separates the tube walls from each other and protects the underlying tube wall from the welding process. At this stage, a rubber pad 50 is secured to the upper surface of tube 72 by means of cover piece 70 which is heat welded to tube 72 by probe 74 which moves in the direction of arrow T between a downward position for pressing cover 70 around pad 50 and firmly against the upper wall 22 of tube 72 and platen 73. The probe is then moved upwardly to a position for releasing the welded components and permitting advancement of the next set of components to be secured together. Probe 74 has an annular contact surface 75 on its underside and includes a cylindrical chamber 76 for receiving pad 50 and pressing cover piece 70 tightly thereover. Probe 74 may include an outer cutting edge 77 for cutting cover piece 70 along line 78 to provide circular cover 40. Alternatively, cover piece 70 may be precut with a circular periphery before being transferred to the welding station of FIG. 6.

Either before or after cover 40 has been heat welded to upper bag wall 22, continuous tube 72 is cut along lines 80 and 81 to provide bag 24. This cutting step may be performed with the tubing on platen 73 or at another station. Inlet and outlet tubes 27 and 28 are then inserted in one open end of bag 24 and both open ends of this tube section are heat welded together to form end flanges 30 and 31 of infusion bag 24.

In the description below of the remaining embodiments of the invention, the same numerals have been used for the same elements as previously described and only the new elements have been assigned a different numeral in order to simplify the explanation of these embodiments. Accordingly, the embodiment of FIG. 7 comprises a tear-off tab 44 having a central section 47 welded to a section 42 of a cover 40 overlying a sterile rubber pad 50. In this embodiment, cover 40 is secured by heat welding or by an adhesive 84 to a mounting subfilm 85 which in turn is mounted on a removable backing strip 86 by a pressure sensitive adhesive 87. Adhesion layers 84 and 87 are annular in planar cross-section so as not to extend beneath pad 50. Pressure sensitive adhesive 87 preferably covers at least a major portion of the underside of film 85.

Figures 6, 7:
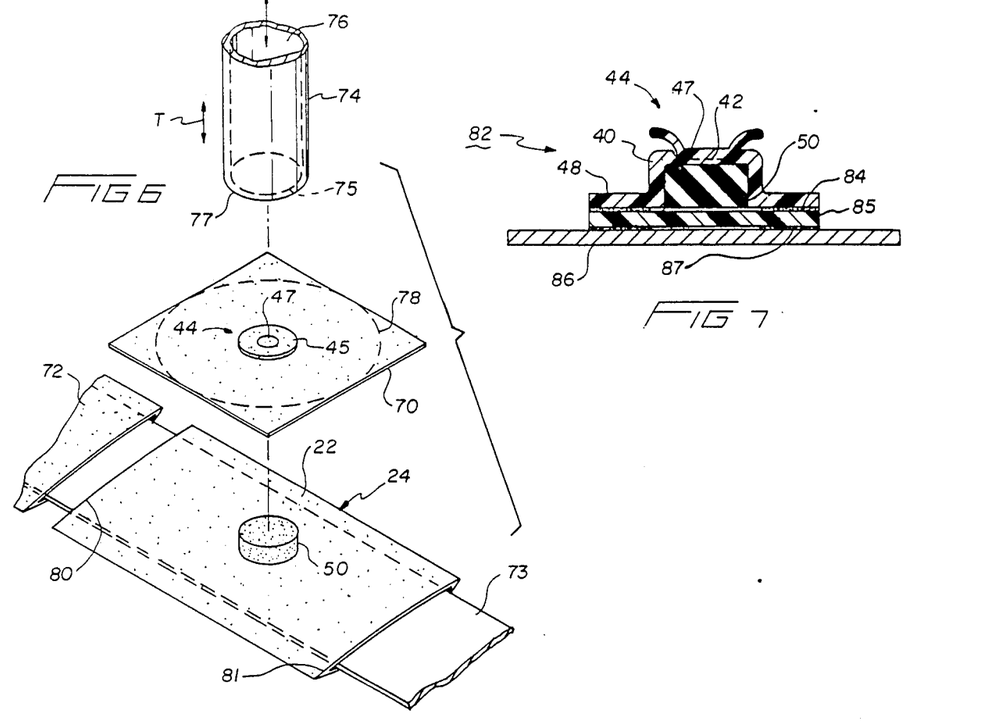
FIG. 6 is a diagrammatic view in perspective illustrating the method of securing the covering film to the tubing from which infusion bags may be made.
FIG. 7 is an elevational view in section illustrating a modification of the invention employing a pressure sensitive adhesive.
Figure 8:
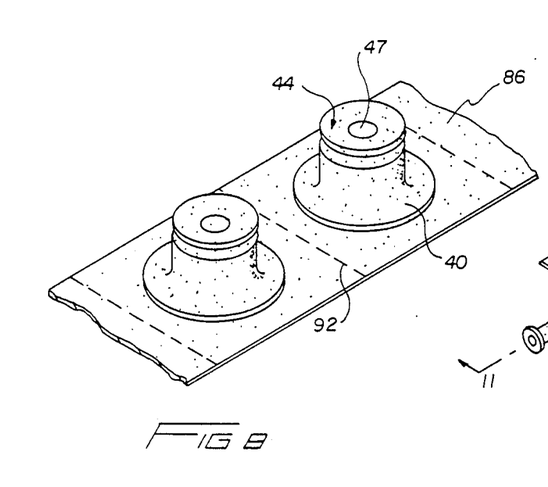
FIG. 8 is a diagrammatic view in perspective illustrating a backing strip for packaging the embodiments of FIG. 7.

As shown in FIG. 8, the embodiment of FIG. 7 may be packaged on strips of backing material 86 which may be perforated along lines 92 so that individual port modules may be torn off and separated from the remaining package. Multiple strips of pressure sensitive modules 82 may be packaged in a sterile condition within a plastic packaging bag (not shown) or other conventional packaging container. The packaging container is then opened when a new supply of pressure sensitive ports is desired and individual modules are torn off from the rest of a backing strip for separate use. The advantage of these modular ports is that one or more ports may be placed in position on an infusion bag immediately prior to injecting the bag with a medication. Thus, when it is desired to inject medication into the contents of a prefilled bag, the backing layer 86 is pulled off of an individual module and the port blister is then pressed against an outer surface of the bag wall in a position similar to that shown in FIG. 1 for the more integral embodiments. The port is then held in position on the bag surface by the pressure sensitive adhesive 87. As an alternative, these modular ports may be mounted on the outer end of a bag tube in a manner similar to the embodiments described below. Tab 44 is subsequently removed and medication injected into the bag contents by piercing the sterile surface of pad 50 with a hypodermic needle, similar to needle 38 in FIG. 1.

Figure 9:
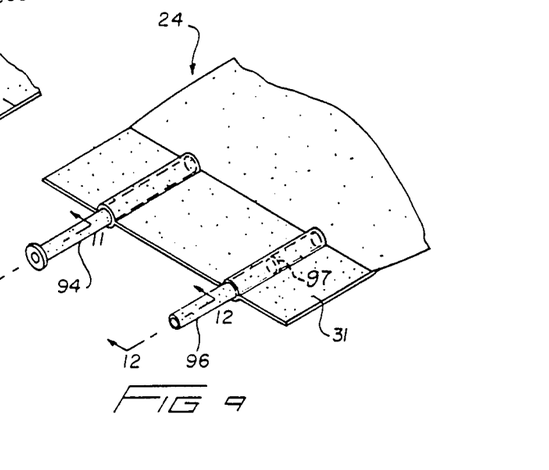
FIG. 9 is a perspective view of another modification of the invention where the injection port is mounted on the exterior end of a tube communicating with the bag interior.
Figures 10, 11:
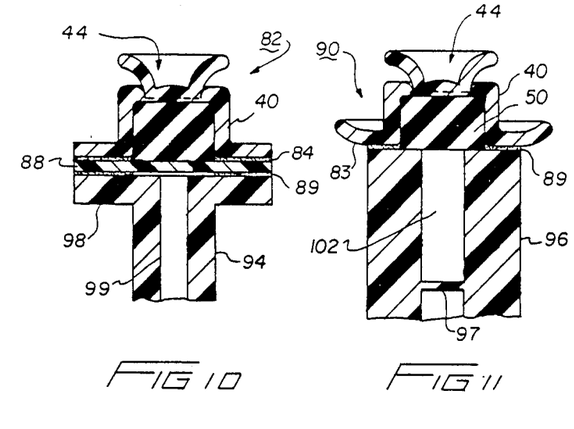
FIG. 10 is an elevational view in section of a port mounted on a fill tube.
FIG. 11 is an elevational view in section of a modified port mounted on a discharge tube.

Instead of being placed on the bag wall as shown in FIG. 1, both the integral embodiments of FIGS. 1–3 and modular embodiments similar to the detachable embodiment of FIGS. 7 and 8 may be installed on the outer end of either the fill tube 94 or the discharge tube 96 as illustrated in FIGS. 9–11. These embodiments of the invention include provisions for protecting the bag contents from those ingredients of pad 50 which might be leachable by contact with the packaged liquid.

FIG. 10 shows a port 82 secured to a flange 98 at the outer end of fill tube 94 by means of an adhesion layer 89 which may be comprised of a permanent or pressure sensitive adhesive or a heat welded layer. The adhesive or weld layer 89 preferably has an annular shape so as to extend around but not across tube passageway 99. This embodiment is preferably used for the fill tube in order to provide the dual functions of sealing off the tube after the bag has been filled and for thereafter providing a pierceable pad for injecting medication into the bag contents. Since the tube passageway 99 is open to the bag interior, a subfilm or protector 88 of leach-resistant plastic prevents the bag contents from coming into contact with pad 50 during the period of time that a filled bag is in storage, which may be a relatively long period of time. When it is desired to inject a medication into the bag contents, tab 44 is removed shortly prior to use, and a hypodermic needle inserted into passage 99 to inject the desired medication. Thereafter, the body of the bag is kneaded so as to wash any residual medication out of passage 99 and thoroughly mix it with the bag contents. Port 82 may thereafter be left in place and discarded along with the bag after its contents have been emptied. A separate outlet tube is contemplated by this embodiment.

Port 90 without a subfilm protector may be used on the outer end of outlet tube 96 as illustrated in FIG. 11. Since the outlet tube has a preformed seal or diaphragm 97 in passageway 102, no protector film is needed beneath pad 50. A feature of this embodiment is that cover 40 is provided with an unsecured overlap or tab portion 83 forming a pull cover so that the entire port 90 can be removed from the end of outlet tube 96 to allow insertion of a drip chamber or other fluid discharging apparatus for puncturing diaphragm 97 as previously described. Where pull cover 40 is heat welded to the outer end of tube 96 or to an intervening protector film (FIGS. 12–15), the dielectric heating probe has a hollow chamber to receive the raised port structure, similar to chamber 76 of probe 74 in FIG. 6, and an annular contact surface of arcuate concave cross-section similar to the probe described below in reference to FIG. 17.

To facilitate the use of tube ports, such as 82 and 90, inlet and outlet tubes 94 and 96 are preferably made of a harder and/or thicker plastic material than are bag walls 22 and 25 in order to provide added protection against accidentally piercing the tube wall with the needle being used to inject medication into the tube passage. The harder tube material may be of a polyvinyl chloride composition having a smaller quantity of plasticizers than the composition used for the more flexible walls of an infusion bag. The subfilms, namely mounting film 85 and protector film 88, are preferably of the same material as cover 40 and about the same thickness or less thick than cover 40.

Although tube ports 82 and 90 are shown with an adhesive securing the port to the outer end of a bag tube, other means of attachment are contemplated, including heat welding. Also tab portion 83 may be employed with the cover 40 of port 82 and tab 83 may be omitted from port 90, depending on whether the port will be ultimately removed and/or the pull force required to remove cover 40. It is desirable that the means of fastening the cover and/or any protector subfilm to underlying structures have sufficient adherence to maintain the port structure in place when tear-away tab 44 is removed to expose sterile injection pad 50.

A unitary tube 103 may be provided with a port 100 such that the combination serves all three functions previously described, namely, filling the bag, adding medication and then discharging the medicated bag contents. The end structure of tube 103 and the shape and arrangement of cover film 40, protector film 88 and injection pad 50 may take various forms, only some of which are illustrated in FIGS. 12–17.

Figure 12:
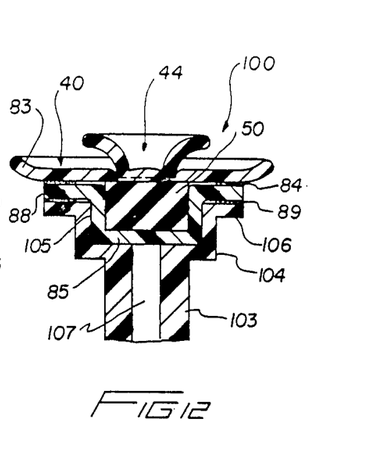
FIG. 12 is an elevational view in section of a port modification providing a unitary tube for an infusion bag.

In FIG. 12, tube 103 may have an outer flange 104 defining an enlarged tube cavity 105 surrounded at its upper edge by a lip 106. Pad 50 and a portion of protector 88 fill cavity 105. The outer portion of protector 88 is secured to lip 106 by an annular adhesion ring 89 and to cover 40 by the annular adhesion ring 84. Port 100 of FIG. 12 is similar to port 90 of FIG. 11 in that pad 50 is removed after injection of the desired medication by pulling off cover 40, thereby releasing pad 50 so that it may be pulled out of cavity 105. Protector 88 may remain in place and is punctured by the drip chamber needle or other discharging connection in a manner similar to diaphragm 34 of FIG. 1 and diaphragm 97 of FIG. 11. Through the provision of protector 88 in combination with a pull tab 83 on cover 40, the infusion bag need only have a single tube 103 which communicates with the bag interior through passage 107. This embodiment has all of the features of an inlet tube, an outlet tube and an injection pad. Thus, the infusion bag may be filled initially through passage 107 and the passage then sealed by application of port module 100. The bag then may be stored with its sealed contents. Immediately prior to dispensing those contents, tab 44 is removed for the injection of medication through pad 50. The bag is then kneaded to thoroughly mix the medication. Thereafter cover 40 and pad 50 are removed and a discharge device inserted into passage 107 through protector film 88.

Figure 13:
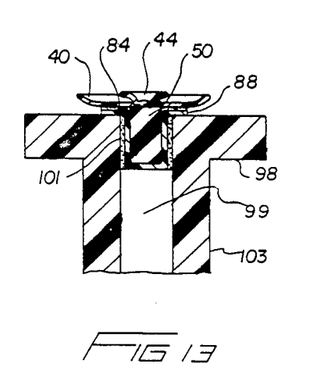
FIG. 13 is an elevational view in section of a modified port mounted on a modified unitary tube.

In FIG. 13, pad 50 comprises an elongated cylinder having a diameter less than the diameter of tube passage 99. Protector 88 is secured to the internal bore of passage 99 by a cylindrical adhesion layer 101. Cover 40 is secured to an outer flange portion of protector 88 by an annular adhesion layer 84.

Figure 14:
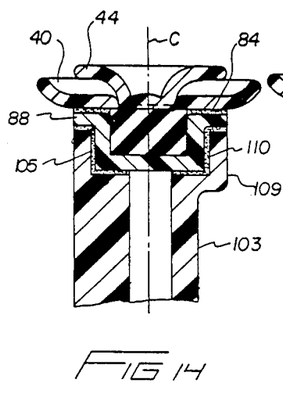
FIG. 14 is an elevational view in section of the modified port of FIG. 12 mounted on two different modifications of a unitary tube.

FIG. 14 illustrates two different structures for the outer ends of unitary tube 103, the structures being different on opposite sides of an imaginary dividing line represented by center line C. Cavity 105 may be formed directly within a tube body of sufficient thickness or may be formed by a radially extending flange structure 109. A principal difference between this embodiment and that of FIG. 12 is that protector 88 is secured to the bottom and sidewalls of cavity 105 as well as to the outer end of the tube by means of an adhesion layer 110. Layer 110 may instead be at any one of these three positions.

Figure 15:
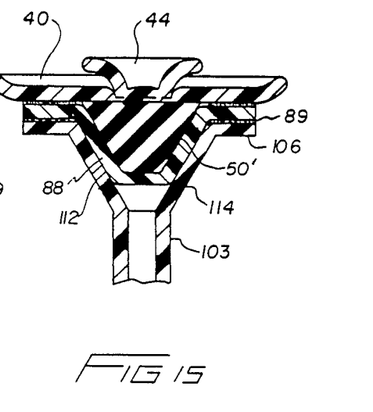
FIG. 15 is an elevational view in section of another port modification mounted on another modification of a unitary tube.

In FIG. 15, unitary tube 103 ends in a conical cavity 112 which receives a conically shaped pad 50' with an intervening protector 88. Cavity 112 is defined by a conical flange 114, the upper edge of which is surrounded by lip 106. Although not shown, adhesion layer 89 may also extend at least partially into cavity 112.

Figure 16:
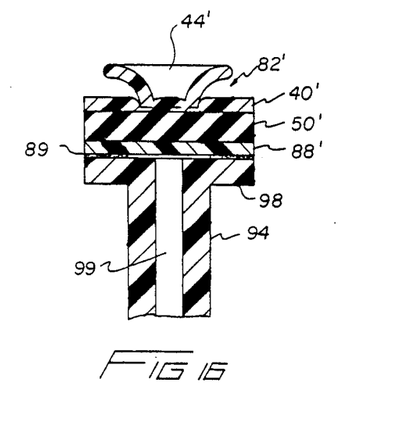
FIG. 16 is an elevational view in section of a laminated port structure.

FIG. 16 shows that a port 82' may be made from a continuous sheet having laminated layers comprising a covering layer 40', a resealable pad layer 50' and a protector layer 88' secured by an adhesion ring 89 to the outer surface of fill tube 94.

Figure 17:
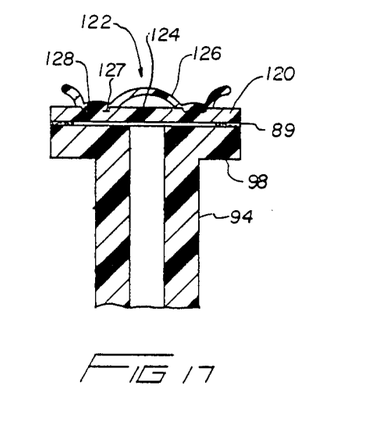
FIG. 17 is an elevational view in section of a modification of the injection pad.

In FIG. 17 the desired properties of the cover layer, the resealable pad layer, and the protector layer are provided by a single homogenous film 120. Pull cover 122 covers a sterile area 124 of pad 120 and comprises a covering film 126 which is of a composition similar to cover 40 previously described. Cover 122 is preferably heat welded to pad 120 along an annular adhesion layer 127 which may be formed by a dielectric heating probe having a hollow interior similar to chamber 76 of probe 74 in FIG. 6 and an annular contact surface of arcuate concave cross-section similar to the cross-section of arcuate contact surface 66 of probe 62 as shown in FIG. 5. This annular probe (not shown) forms an adhered annulus 128 having a convex surface encircling the sterile area 124 beneath the central unadhered portion of cover 122. The radial width of annulus 128 and/or the welding conditions are chosen such that the strength of adhesion layer 127 is substantially less than the rupture strength of film 126 so that cover 122 can be pulled away from pad 120 to expose sterile area 124. Pull cover 122 may be used also in place of tear-away tab 44' in the embodiment of FIG. 16 since covering layer 40' may also be pierceable by a needle to inject medication into passage 99, in which case a cover is needed only to protect a sterile surface area through which the needle may be inserted.

What is claimed is:

1. A port structure pierceable by a hollow needle for providing fluid communication with the interior of a container for medicinal liquids or the like, said port comprising in combination:

a sterile pad of resealable material for sealing a puncture caused by penetration of said pad with said needle;

a cover of thin flexible plastic film sealingly adhered to a base member and defining therewith a sealed enclosure for said pad, said film being sufficiently thin and flexible to conform substantially to the shape of said pad; and, a tear strip of thin flexible plastic film having a portion thereof adhered to said thin-film cover so as to form a removable tear-off tab comprised of said thin-film tear strip and a portion of said thin-film cover adhered thereto, said adhered cover portion being removable as part of said tab and being defined by a wall-thinning indentation extending inwardly toward said pad;

said tear strip further having a gripping portion which overlies and is free in relation to said thin-film cover, said tab being connected to an unadhered portion of said thin-film cover along a tearable joint provided by said wall-thinning indentation of substantially less tear strength than either said tab or the unsecured portion of said thin-film cover, said port structure combination having a total thickness substantially equal to the sum of the thicknesses of said pad, said thin-film cover and said thin-film tear strip, said sealed enclosure maintaining the sterility of said pad until said tab is removed, and the removal of said tab exposing a sterile portion of said pad to permit piercing of said pad by said needle to provide said fluid communication.

2. The port of claim 1 in which said tearable joint between said tab and said unsecured cover portion has a thickness substantially less than the thickness of either said tab or said thin film cover.

3. The port of claim 1 in which the thin film from which said cover is formed has substantially the same thickness as the thin film from which said tear strip is formed.

4. The port of claim 1 in which the thin film from which said cover if formed is thicker than the thin film from which said tear strip is formed.

5. The port of claim 1 in which said cover is secured to said base member by an adhesive.

6. The port of claim 1 in which said cover is secured to said base member by an adhesion layer formed by welding with dielectric heating.

7. The port of claim 1 in which said secured tear strip portion and said secured cover portion are secured together by an adhesion layer formed by welding with dielectric heating.

8. The port of claim 7 in which said tear strip is round, and in which said mutually secured portion of tear strip and cover are round and are located approximately in the center of said tear strip so as to form a removable tab with an annular lap.

9. The port of claim 1 in which said base member comprises a wall of said container made from thin-film plastic.

10. The port of claim 1 in which said pad is cylindrical, and in which said thin film cover is secured to said base member by an annular adhesion layer adjacent to the circular periphery of said cylindrical pad.

11. The port of claim 1 in which said secured tear strip portion is welded to said secured cover portion so as to provide said tear tab.

12. A port structure pierceable by a hollow needle for providing fluid communication with the interior of a container for medicinal liquids or the like, said port comprising in combination:

a sterile pad of resealable material for sealing a puncture caused by penetration of said pad with said needle;

protector means for preventing contact between said pad and the contents of said container and including a base member pierceable by said needle, said base member comprising a thin flexible plastic film with one side adjacent said pad;

a cover of thin flexible plastic film sealingly adhered to said thin-film base member and defining therewith a portable module providing a sealed enclosure for said pad, said films being sufficiently thin and flexible to conform substantially to the shape of said pad;

mounting means for mounting said module on said container so that said pad and said base member are in a position for being pierced by said needle so as to provide said fluid communication and said pad is in a position for sealing said needle puncture in said pad and said base member upon withdrawal of said needle, said mounting means including adhesion means on the side of said thin-film base member opposite from said pad for sealingly mounting said module on said container; and, a tear strip of thin flexible plastic film having a portion thereof adhered to said thin-film cover so as to form a removable tear-off tab comprised of said thin-film tear strip and a portion of said thin-film cover adhered thereto, said adhered cover portion being removable as part of said tab and being defined by a wall-thinning indentation extending inwardly toward said pad;

said tear strip further having a gripping portion which overlies and is free in relation to said thin-film cover, said tab being connected to said thin-film cover along a tearably joint provided by said wall-thining indentation of substantially less tear strength than either said tab or said thin-film cover, said port structure combination having a total thickness substantially equal to the sum of the thicknesses of said pad, said thin-film cover said base member and said thin-film tear strip, said sealed enclosure maintaining the sterility of said pad until said tab is removed;

and the removal of said tab exposing a sterile portion of said pad to permit penetration of said needle through said pad and said thin-film base member to provide said fluid communication with the interior of said container.

13. The port of claim 12 in which said module is mounted on a wall of said container made from thin-film plastic.

14. The port of claim 12 for a container with a plastic tube having a passage communicating with the interior of said container, and in which said module is mounted on an outer end portion of said tube.

15. The port of claim 14 in which the plastic material of said tube is of greater hardness than a wall of said bag so that the wall of said tube passage has a greater resistance to puncture by said needle than said bag wall.

16. The port of claim 14 in which the outer end of said tube includes a radially extending flange, and in which said thin-film base member is adhered to an exterior surface of said flange.

17. The port of claim 12 in which said adhesion means includes an adhesion layer of pressure sensitive adhesive for sealingly adhering said thin-film base member to said container.

18. The port of claim 17 in which said thin-film base member includes a portion extending beyond said adhesion layer so a to provide a pull tab such that said module may be detached from a backing strip and secured to said container by gripping said pull tab.

19. The port of claim 17 in which said port further includes a strip of backing material for mounting a plurality of said modules in a package.

20. The port of claim 12 in which said cover is adhered to said thin-film base member by a first annular adhesion layer, said thin-film base member is adhered to said container by a second annular adhesion layer and both said first and second annular adhesion layers are positioned beyond the periphery of said pad so as not to extend between said pad and said container.

* * * * *

UNITED STATES PATENT AND TRADEMARK OFFICE
CERTIFICATE OF CORRECTION

PATENT NO. : 4,632,673

DATED : December 30, 1986

INVENTOR(S) : Tiitola, et al.

It is certified that error appears in the above-identified patent and that said Letters Patent is hereby corrected as shown below:

In column 9, line 55, change "if" to --is--.

In column 10, line 60, after "cover" insert a comma.

In column 12, line 5, change "a" to --as--.

Signed and Sealed this

Seventh Day of April, 1987

Attest:

DONALD J. QUIGG

Attesting Officer

Commissioner of Patents and Trademarks